Jan. 21, 1936. M. PIER ET AL 2,028,348
PROCESS FOR HYDROGENATING DISTILLABLE CARBONACEOUS MATERIALS
Filed Dec. 22, 1932
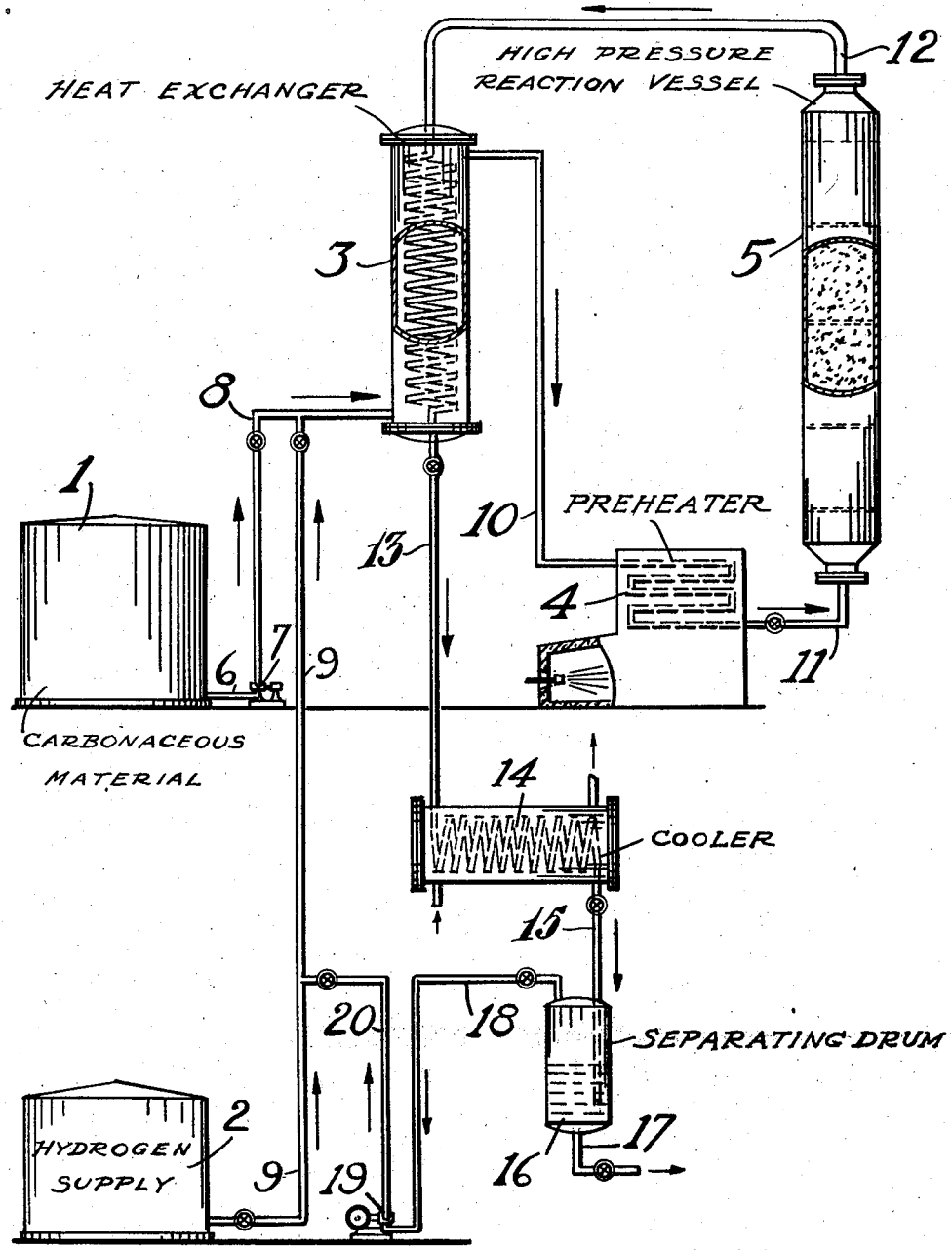
Mathias Pier
Walter Simon  Inventors
Walter Koenig
By P. L. Young Attorney Patented Jan. 21, 1936

2,028,348

UNITED STATES PATENT OFFICE 2,028,348

PROCESS FOR HYDROGENATING DISTILLABLE CARBONACEOUS MATERIALS

Mathias Pier, Heidelberg, and Walter Simon and Walter Kroenig, Ludwigshafen-on-the-Rhine, Germany, assignors to Standard-I. G. Company, Linden, N. J., a corporation of Delaware Application December 22, 1932, Serial No. 648,435
In Germany January 2, 1932

2 Claims. (Cl. 196—53)

This invention is concerned with the treatment with hydrogenating gases of distillable carbonaceous materials.

It has already been proposed in the production of valuable hydrocarbon products, and in particular those of low boiling point, by destructive hydrogenation of distillable carbonaceous materials, by treatment with hydrogen or gases containing hydrogen at temperatures above 300° C. and under elevated pressure, to work in contact with catalysts containing halogens in a free or combined state.

We have now found that particularly good results are obtained in the treatment with hydrogenating gases of distillable carbonaceous materials, by working in contact with catalysts consisting of or containing (preferably to an extent of at least 10 per cent by weight) a halogen compound of molybdenum, tungsten or vanadium or mixtures thereof.

More particularly the chlorine compounds, bromine compounds or iodine compounds of the said metals come into question.

It is not necessary for other catalysts to be simultaneously present, since the said halogen compounds themselves have a very considerable catalytic activity.

Improved results are, however, usually obtained by employing the said halogen compounds simultaneously with other compounds of metals of the second to the eighth group of the periodic system or mixtures of these, and more particularly the oxides, hydroxides, phosphates or sulphides of the said metals. Especially good results are obtained with the compounds of metals of the groups 5 and 6 of the periodic system. The addition of other compounds of heavy metals as for example compounds of copper, silver, zinc, tin, cadmium, manganese, uranium, rhenium and especially nickel or cobalt and more particularly the oxides, hydroxides, sulphides or carbonates of said heavy metals give very good results. Compounds, such as oxides, hydroxides, sulphides or carbonates of lithium, magnesium or aluminium may also be employed. Elementary silicon or compounds thereof may also be present.

The nitrides, phosphides, borides, arsenides and selenides of the metals of groups 2 to 8 of the periodic system also form suitable additions.

Carrier substances or substances having a dispersing action, and which sometimes also have a catalytic action, for example active carbon, silica gel, pumice stone or porous sherds of burned fire clay, may also be employed.

About 0.01 to 10% by weight of said halogen compound may be added to the initial materials. When treating coal pastes or hydrocarbons of high boiling point which are passed out of the reaction vessel together with the reaction products, preferably an amount of catalyst of between 0.01 and 5 per cent by weight is employed, whereas in the treatment of liquid hydrocarbon initial materials of high boiling point, when the benzine and middle oil fractions distil off from the reaction vessel whilst the higher boiling products remain therein, it may be advantageous to work with a higher concentration of catalyst.

As initial materials for treatment in accordance with the present invention may be employed coals of all varieties, such as pit coal or brown coal, as such or made into a paste or suspension in oil, shale, peat, tars, mineral oils, shale oils or the distillation, conversion or extraction products from the same, as for example products obtained by cracking or destructive hydrogenation. Good results are also obtained by the process according to the present invention in the destructive hydrogenation of asphalts or resins.

The catalysts in accordance with the present invention may be employed when working in the liquid, gaseous or solid phase.

The catalyst may be introduced into the reaction vessel at any suitable point. Thus it may be mixed with the initial materials prior to their introduction into the preheating zone, where such is employed, or only after preheating, or the catalyst may be introduced directly into the reaction vessel. If desired, and more particularly when working in the gaseous phase, the reaction vessel may be packed with catalyst or the catalyst may be arranged on suitable supports in the reaction vessel, which may if desired be movable. In this case it is not essential also to mix catalyst with the initial materials.

The catalyst may, if desired, be wholly or in part employed in a finely ground state, the grinding being even carried down to colloidal dimensions. Solid carbonaceous initial materials may be impregnated with a solution of the catalytic material.

The expression "treatment with hydrogenating gases of distillable carbonaceous materials" is intended to comprise the most varied reactions, and the catalysts employed in accordance with the present invention have been found to be particularly advantageous in all of these said reactions. Thus the expression more particularly includes the destructive hydrogenation of carbonaceous materials, such as coal of all varieties, including lignite, other solid carbonaceous materials, such as peat, shales and wood, or mineral oils, tars and the distillation, conversion and extraction products thereof, to produce hydrocarbons of all sorts, such as motor fuels and in particular antiknock motor fuels, middle oils, kerosene and lubricating oils. The said expression also includes the removal of non-hydrocarbon impurities, such as sulphur- or oxygen-containing substances or nitrogen compounds by the action of hydrogen or gases containing or supplying hydrogen, from crude carbonaceous materials, for example the refining by treatment with hydrogen of crude benzol, of crude motor fuels or of lubricating oils. The said expression further includes the conversion of oxygen- or sulphur-containing organic compounds to produce the corresponding hydrocarbons or hydrogenated hydrocarbons, for example the conversion of phenols or cresols into the corresponding cyclic hydrocarbons or hydrogenation products thereof. Finally it includes the hydrogenation of unsaturated compounds and more particularly of unsaturated hydrocarbons or of aromatic compounds and more particularly of aromatic hydrocarbons, for example, to produce hydroaromatic hydrocarbons.

The said reactions with hydrogen or hydrogen-containing gases are usually carried out at temperatures between 250° and 700° C. and as a rule between 380° and 550° C. The pressures employed are usually in excess of 20 atmospheres and as a rule preferably in excess of 50 atmospheres. In some reactions, however, for example in the refining of crude benzol rather low pressures, for example of the order of 40 atmospheres may be employed. Generally, however, pressures of about 100, 200, 300, 500 and in some cases even 1000 atmospheres come into question.

The amount of hydrogen maintained in the reaction space, and parts connected therewith if any, varies greatly with the nature of the particular initial materials treated or according to the result in view. In general 400, 600, 1000 cubic meters or more of hydrogen, measured under normal conditions of temperature and pressure, per ton of carbonaceous materials treated may be used.

The gases for use in the reaction may consist of hydrogen alone or of mixtures containing hydrogen (for example a mixture of hydrogen with nitrogen, or for example water gas), or of hydrogen mixed with carbon dioxide, sulphuretted hydrogen, water vapour or methane or other hydrocarbons. Or the hydrogen may be generated in the reaction chamber by the interaction of water and coal, carbon monoxide, hydrocarbons and the like.

The nature of the invention and the manner in which it is carried out will be fully understood from the following description read in reference to the accompanying drawing, which is a diagrammatic view in sectional elevation of one type of apparatus suitable for the purpose.

Referring to the drawing, numeral 1 designates a supply tank for the distillable carbonaceous material to be hydrogenated. Numeral 2 designates a supply tank of hydrogen or gas containing same. Numeral 3 designates a heat exchanger, numeral 4 a preheater, and numeral 5 a high pressure reaction vessel adapted to contain catalytic material supported therein. Carbonaceous material is withdrawn from tank 1 through line 6 by means of pump 7, and forced through line 8 into and through heat exchanger 3, wherein it is partially preheated by interchange of heat with the hot products leaving the reaction vessel 5.

Hydrogen is withdrawn from supply tank 2 through line 9 which meets line 8 carrying carbonaceous material, so that a mixture of hydrogen and oil passes through the heat exchanger. After passing through the exchanger, the mixture flows through line 10 into and through a preheater 4, wherein the temperature is raised to over 450° C. From the preheater, the hot mixture flows through line 11 into the bottom of the high pressure reaction vessel 5 adapted to be maintained under pressures in excess of 20 atmospheres, preferably in excess of 50 atmospheres, and as high as 1000 atmospheres. Reaction vessel 5 is provided with catalytic material which may be supported on trays, or by other similar means.

The hot products flows out of reaction vessel 5 through line 12, pass through heat exchanger 3 in the direction opposite to the incoming carbonaceous material, and thence flow through line 13 into cooler 14, and finally through line 15 into separating drum 16. Liquid is withdrawn from separator 16 through line 17, and vapors may be removed through line 18 by means of pump 19. The vapors from separating drum 16 are rich in hydrogen and may be returned to the hydrogen supply line through line 20.

It is particularly advantageous to operate by continuously introducing fresh carbonaceous material into the reaction vessel and to continuously remove products therefrom. If desired, several reaction vessels may be employed in which different conditions of temperature and/or pressure may, if necessary, be maintained and in which different catalysts may also be employed. Sufficiently converted reaction products may be removed after any of the reaction vessels. Materials which have not been sufficiently reacted on may be recycled or treated in a further reaction vessel.

The benzines obtained according to the present process when working in the vapour phase are usually characterized by the feature that the fraction thereof boiling between 110° and 190° C. has a particularly low content in hydrogen whereas as a general rule, it is just this fraction of the benzine which particularly gives rise to knocking when it is employed as a fuel in internal combustion engines. In addition to such benzine a middle oil rich in hydrogen is usually obtained, which may be employed directly as an illuminating oil or as a Diesel oil, or which may be converted into benzine by cracking or a further destructive hydrogenation.

The expression "halogen compound of molybdenum, tungsten or vanadium" where herein employed is intended to indicate that the halogen atom therein is combined with the molybdenum, tungsten or vanadium atom by a main valency, or by main valency to an atom bound to said metals by a main valency. It is not intended to include double compounds of compounds of molybdenum, tungsten or vanadium not containing halogen atoms with halogen compounds of other metals.

The following examples will further illustrate how the invention may be carried out in practice, but it should be understood that the invention is not restricted to the said examples. The parts are by weight unless otherwise stated.

*Example 1*

A catalyst is prepared by pressing tungsten iodide into regular shapes. Vapours of a middle oil boiling between 200° and 325° C. are passed together with hydrogen under a pressure of 200 atmospheres and at a temperature of 425° C. over the said catalyst. The said initial middle oil is derived from the destructive hydrogenation of brown coal. From the gases and vapours leaving the reaction vessel a product may be condensed, which consists to the extent of 50 per cent of constituents boiling below 185° C. The knock rating of this benzine corresponds to that of a mixture of about 70 parts of iso-octane and 30 parts of normal heptane. The middle oil is free from phenols and is so rich in hydrogen that it may be employed as a Diesel oil.

Example 2

A catalyst is prepared by mixing 70 parts by weight of a tungsten sulphide, prepared by decomposition of ammonium sulphotungstate or by treatment of ammonium tungstate with hydrogen sulphide under a pressure of 5 atmospheres and at a temperature of 410° C. with 30 parts by weight of molybdenum bromide. Over this catalyst a middle oil distilled from mineral oil is passed in the vaporous phase together with hydrogen at a temperature of 440° C. and under a pressure of 200 atmospheres. The product contains 60 per cent of benzine, which has a knock rating corresponding to that of a mixture of about 69 parts of iso-octane with 31 parts of normal pentane. The middle oil is very rich in hydrogen, so that it can be employed directly as an illuminating oil.

If molybdenum bromide is not added to the tungsten sulphide a benzine is obtained which has a knock rating corresponding to a mixture of 63 parts of iso-octane with 37 parts of normal pentane.

Example 3

The vapours of a middle oil, which has been obtained by destructive hydrogenation of a mineral oil, are passed together with hydrogen under a pressure of 190 atmospheres and at a temperature of 480° C. over a catalyst consisting of molybdenum bromide. A product is obtained consisting to the extent of 60 per cent of a benzine the knock rating of which corresponds to that of a mixture of 73.8 parts of iso-octane with 26.2 parts of normal pentane. The residual 40 per cent consist of a middle oil rich in hydrogen which may be employed as a Diesel oil or as an illuminating oil or which may be recycled to the reaction vessel for conversion into benzine.

Example 4

Pit coal is finely ground and mixed with 50 per cent of its weight of a heavy oil obtained by the destructive hydrogenation of the said coal. To this mixture 2 per cent based on the weight of coal of molybdenum iodate or vanadium iodide is added. This mixture is then spread in the form of a thin layer on plate-like insertions in a high pressure reaction vessel and is heated for 3 hours to a temperature of about 450° C. in a current of streaming hydrogen under a pressure of 250 atmospheres. 93 per cent of the coal is thus converted into valuable products for the most part liquid which contain less than 5 per cent of asphalt.

Example 5

A residue boiling above 325° C. obtained from mineral oils is mixed with 5 per cent of its weight of molybdenum chloride, and is heated in an autoclave for a period of 5 hours to a temperature of 405° C. Prior to the said heating hydrogen is pressed into the said autoclave up to an initial pressure of 180 atmospheres. The reaction product on distillation yields 45 per cent of an overhead consisting of benzine and gas oil and 55 per cent of a distillation residue. On subjecting the residue to a de-waxing treatment a lubricating oil is obtained having a viscosity of 5.4° Engler at 50° C., a specific gravity of 0.898, a flat temperature viscosity curve and a green colour. By a mere distillation of the residual oil employed as the initial material it is impossible to obtain oil from which by simple de-waxing a lubricating oil can be obtained, since this has too high a content of asphalt.

Example 6

A residue obtained by distilling off from a German mineral oil those constituents boiling below 325° C. is mixed with 0.01 per cent by weight of very finely divided molybdenum trioxide. The oil is then passed together with hydrogen under a pressure of 250 atmospheres through a preheater in which it is heated to a temperature of 460° C. Prior to the entry of the material into the reaction vessel 0.02 per cent by weight of molybdenum chloride calculated on the initial material is added in the form of a very thorough dispersion in oil. In the separating vessel arranged after the reaction vessel and which is maintained at a temperature of 450° C. the products leaving the reaction vessel are separated into a current of hydrogen containing the effluent hydrocarbon vapours which amount to about 93 per cent of the products and about 7 per cent of residues which contain the catalyst and the highest boiling products. The condensate recovered from the effluent vapours contain about 50 per cent of constituents boiling below 325° C. Those constituents boiling above 325° C. are recycled to the reaction vessel or they are treated in another reaction vessel separately in the presence of finely divided or rigidly arranged catalysts so as to be converted into products boiling below 325° C.

In our copending application Ser. No. 648,436, filed at the same date as this application, we have claimed a process in which distillable carbonaceous materials are hydrogenated in the presence of iodine compounds of copper, titanium, tin or manganese.

What we claim is:

1. The process of destructively hydrogenating a middle oil which comprises subjecting said oil to the action of hydrogen at a temperature of about 440° C. and under a pressure of 200 atmospheres in the presence of a catalyst consisting of molybdenum bromide and tungsten sulfide.

2. The process as defined in claim 1, wherein the conversion is conducted in the vapor phase.

MATHIAS PIER.
WALTER SIMON.
WALTER KROENIG.